United States Patent [19]
Pfeffer

[11] Patent Number: 4,682,412
[45] Date of Patent: Jul. 28, 1987

[54] INSERTION TOOL

[75] Inventor: George B. Pfeffer, Minnetonka, Minn.

[73] Assignee: ADC Telecommunications, Inc., Minneapolis, Minn.

[21] Appl. No.: 830,979

[22] Filed: Feb. 19, 1986

[51] Int. Cl.[4] .......... B23P 19/02
[52] U.S. Cl. .......... 29/750; 29/758; 29/254; 30/367; 227/132; 173/123
[58] Field of Search .......... 29/747, 748, 749, 750, 29/751, 752, 758, 254, 566.4; 30/367; 81/463-466; 173/122-124, 94; 227/132

[56] References Cited

U.S. PATENT DOCUMENTS

| | | | |
|---|---|---|---|
| 783,749 | 2/1905 | Hartley et al. | 30/367 |
| 797,824 | 8/1905 | Seitz | 30/367 |
| 947,391 | 1/1910 | Michael | 30/367 |
| 1,572,046 | 2/1926 | Seiler | 30/367 |
| 1,593,287 | 7/1926 | Card, Jr. . | |
| 2,384,707 | 9/1945 | Sweet | 30/367 |
| 2,960,864 | 11/1960 | Watts | 73/862.01 |
| 3,074,155 | 1/1963 | Cootes et al. | 81/463 |
| 3,172,204 | 3/1965 | Frey | 30/367 |
| 3,177,952 | 4/1965 | West . | |
| 3,279,044 | 10/1966 | Roper . | |
| 3,604,092 | 9/1971 | Knickerbocker . | |
| 3,708,852 | 1/1973 | Mason . | |
| 3,883,316 | 5/1975 | Mason . | |
| 3,946,476 | 3/1976 | Mason . | |
| 4,161,061 | 7/1979 | Mason et al. | 29/566.4 |
| 4,241,496 | 12/1980 | Gregson | 29/751 |
| 4,434,542 | 3/1984 | Forberg et al. | 29/566.4 |

*Primary Examiner*—Percy W. Echols
*Attorney, Agent, or Firm*—Merchant, Gould, Smith, Edell, Welter & Schmidt

[57] ABSTRACT

A wire insertion tool is disclosed including a manually engageable handle having an impact receiver slideably received on said handle. An impactor is carried on the handle and includes an impactor movable between a rest position and a displaced position and also movable between a load position and a fire position. The impactor presents a first surface opposing the impact receiver when in the load position and a second surface opposing the impact receiver when in the fire position. The second surface is spaced away from the first surface. A compression spring is provided for yieldably urging the impactor toward the impact receiver and toward the load position. A pivot mechanism pivots the impactor against the urging of the compression spring to the fire position as the impactor is moved to the displaced position.

9 Claims, 7 Drawing Figures

INSERTION TOOL

BACKGROUND OF THE INVENTION

I. Field of the Invention

This invention pertains to insertion tools for inserting insulated wires into terminal connecting blocks and terminating the electrical conductor at the block. More particularly, this invention pertains to insertion tools which include impactors to assist in termination of the electrical conductor.

II. Description of the Prior Art

Tools for terminating electrical conductors at a terminal block are well known. Additionally, such tools having hammer mechanisms to assist in termination are also well known. An example of the latter is found in U.S. Pat. No. 3,883,316 to Mason dated May 13, 1975. Mason is typical of prior art termination tools with hammer mechanisms in that the hammer mechanism includes a resiliently displaced sear (shown at 34 in Mason) which is carried within the hammer mechanism and moves laterally to the direction of travel of the hammer mechanism. The sear engages a cam surface which urges the sear against its resilient displacement during sliding motion of the termination tip which is slideably secured to the termination tool. After the termination tip has urged the hammer against the resilience of a main spring a predetermined stroke, the sear presents an opening which is aligned with a pin on the termination tip such that the hammer is free to impact the termination tip. In Mason, the termination tip carries a blade having a cutting edge 12 which, upon impact from the hammer mechanism, severs an electrical conductor. A problem associated with such a tool is that due to the need for a laterally moving sear, there are limitations put on the size and mass of the hammer mechanism thereby compromising its effectiveness. Also, the relatively long longitudinal dimension of the hammer mechanism together with a relatively short spring results in the spring generally being cycled repeatedly from near full compression to near full expansion. This repetition can, over time, take its toll on the spring.

U.S. Pat. No. 2,960,864 to Watts dated Nov. 22, 1960 teaches an insertion tool for making electrical connections. Unlike the Mason patent which uses a hammer mechanism with a laterally movable sear, the Watts patent uses an impactor having a first end with a bore sized to receive an impact pin and a longitudinally displaced second end which acts as a lever point. As the impactor is forced against the urging of a spring, the impactor pivots about the longitudinally displaced pivot point until the impactor bore is aligned with the impactor pin. At this point, the spring forces the impactor against the pin.

The impactor of the Watts patent overcomes one of the disadvantages of the Mason patent in that the need for a sear is eliminated. However, the lever movement of the Watts impactor requires the need for a substantial amount of unused space within the tool to accommodate the displacement of the impactor through the lever action. Also, like the Mason patent, the relatively long longitudinal dimension of the lever action impcator results in use of a short high tension spring which is almost fully compressed during its repeated use.

It is intended the present invention will be particularly useful with a terminal block as described in commonly assigned and copending U.S. patent application Ser. No. 658,268, entitled "Electrical Connector Mo ule With Multiple Connector Housings." As illustrat in U.S. Ser. No. 658,268, each insulation displaceme terminal includes a seam or slot including wire piercir edges which cut through the insulation as the wire slid into the slot and a trimming edge radially opposi the seam or slot which cuts the excess length from wire as it is installed.

U.S. Ser. No. 658,268, now abandoned, also teaches tool tip to be used to insert a wire in the insulatic displacement terminal. Tool tips for inserting wires in such terminals are also shown in commonly assigne and copending U.S. patent application Ser. No. 800,99 now U.S. Pat. No. 4,663,838 which is a continuation-i part of commonly assigned copending U.S. patent appl cation Ser. No. 789,470, now abandoned. These applic tions teach a debris ejecting insertion tool tip for enga ing a wire to urge the wire into the split cylinder term nal. The insertion tips of these applications include a ejector for ejecting debris (such as spent insulatio from the tool tip. With such a system where the wi terminating blade is located on the split cylinder term nal, the problem of Mason which included wear of th terminating blade is not experienced since a wire to b terminated is exposed to a fresh blade in each instanc In addition to the desireability of the above syste where the termination blade is located on the split cyli der terminal, it is also desireable to provide an improve insertion tool having an enhanced impact mechanisn Such tools must be of a design which permits them to b employed in a rugged environment. Also, it is desireabl that such tools have a minimum number of movin elements and provide maximum impact to assist in te minating a wire. Also, the ability to adjust the tension c such tools is also a desireable feature.

OBJECTS AND SUMMARY OF THE PRESENT INVENTION

It is an object of the present invention to provide a insertion tool having an improved impactor mechanis for impacting an insertion tip.

A further object of the present invention is to provid an insertion tool having an impactor mechanism o increased mass and simplicity of design.

A still further object of the present invention is t provide an insertion tool having means for selectivel adjusting the tension of the impactor mechanism.

According to a preferred embodiment of the presen invention there is provided an insertion tool comprisin a manually engageable handle with an impact receive in the form of an insertion tip having both a force re ceiving end and a force transmitting end. The impac receiver is carried on the handle and is slideable in predetermined direction extending between the forc receiving end and the force transmitting end. An impac tor is carried on the handle to provide an impact on th force receiving end of the impact receiver. The impac tor is slideable in the predetermined direction between rest position and a tension or displaced position. Th impactor is also movable in a second direction betwee an impactor load position and an impactor fire position In the impactor load position, the impactor presents first surface opposing an abutting force receiving end When in the impactor fire position, the impactor pres ents a second surface opposing the force receiving end The second surface is spaced away from the first surfac on a side thereof opposite the force receiving end. A first spring is provided for urging the impactor toward the force receiving end and toward the load position. Means are provided for moving the impactor against the urging of the first spring means to move the impactor from the load position to the fire position as the impactor is moved to the tension or displaced position. When moved to the fire position, the impactor's second surface opposes the force receiving end of the impact member in spaced relation. This first spring urges the impactor to move toward the impact receiver with the second surface impacting on the force receiving end and the impact receiver transmitting this blow to a target through the force transmitting end.

DESCRIPTION OF THE PREFERRED EMBODIMENT

Figure 1:
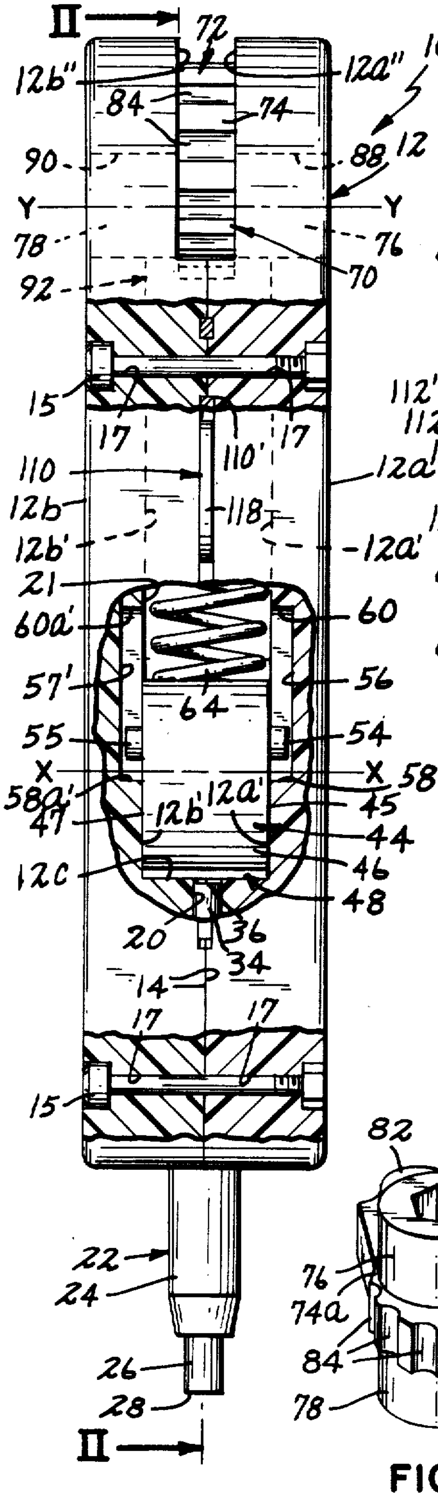
FIG. 1 is a side view of an insertion tool according to the present invention.

Referring now to the Figures in which identical parts are identified with the same numeral throughout the various figures, an insertion tool according to the present invention is generally shown at 10. The insertion tool includes a handle member 12 preferably formed of identical plastic halve 12a and 12b joined at a common parting surface 14. Allen-head bolts 15 received within aligned threaded bores 17 join halves 12a and 12b to form handle 12. Opposing surfaces of handle halves 12a and 12b define a series of interconnected chambers extending through the longitudinal dimension of handle 12. The chambers include a cylindrical impact member passage 16, a reload spring chamber 18, a reduced diameter rod passage 20 and an impactor mechanism pocket 21.

Figure 2:
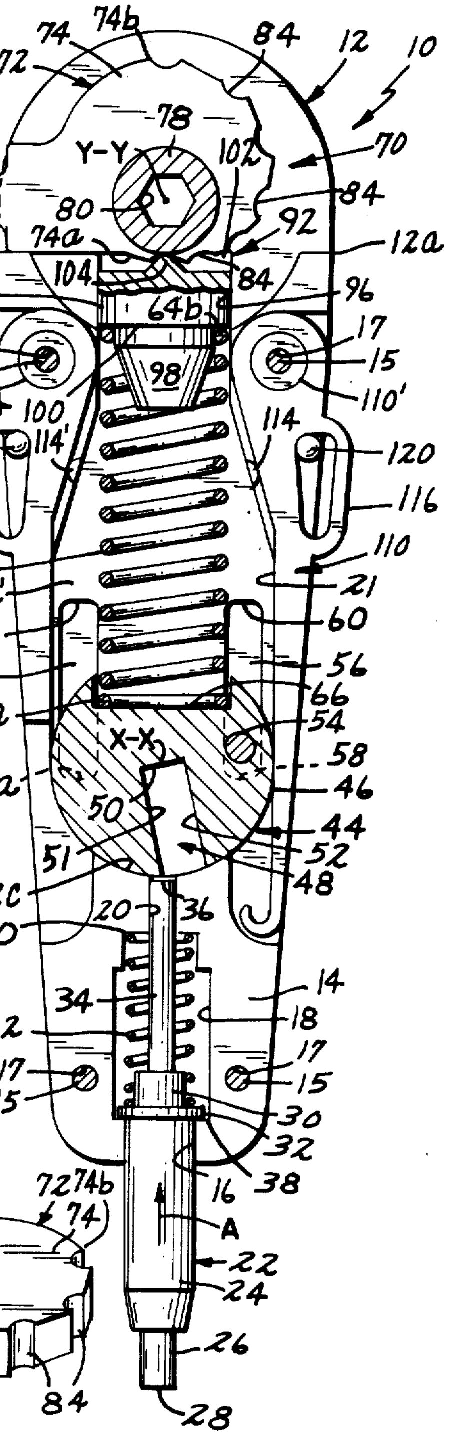
FIG. 2 is a view taken along lines II–II of FIG. 1.

An impact receiver 22 is provided and is preferably a debris ejecting wire insertion tool such as those shown in U.S. patent application Ser. Nos. 789,470, now abandoned, and 800,998, now U.S. Pat. No. 4,663,838. The impact receiver 22 includes a cylindrical sleeve member 24 with an integral tip portion 26 having a force transmitting end 28. A collar 30 is secured to an axial end of sleeve 24 opposite tip 26. Disposed between the collar 30 and sleeve 24 is a radial flange 32. A rod 34 extends axially away from collar 30 and terminates at a force receiving end 36. As shown in FIG. 2, sleeve 24 is sized to be slideably received within impact tip passage 16 and rod 34 is sized to be slideably received within rod passage 20.

Reload spring chamber 18 has a forward axial wall 38 and a rear axial wall 40. Flange 32 is sized to have a diameter greater than impact tip passage 16 and abut wall 38. Rod 34 is dimensioned such that when flange 32 abuts wall 38 force receiving end 36 is spaced away from the impactor mechanism pocket 21. A reload compression spring 42 surrounds rod 34 and collar 30 with one end of the spring 42 abutting rear axial wall 40 and the other end of the spring abutting flange 32. The reload compression spring 42 urges impact receiver 22 to a position with flange 32 abutting wall 38.

An impactor 44 is provided in the form of a cylinder of suitable massive material such as steel. Impactor 44 is disposed within impactor mechanism pocket 21. As shown in the Figures, impactor 44 has a cylindrical outer surface 46 and is provided with a slot 48 extending radially inwardly from surface 46 to the center of cylindrical impactor 44 and terminating at a back surface 50. Slot 48 is defined by cooperation of back surface 50 and spaced apart side walls 51 and 52. Side walls 51 and 52 are spaced apart a distance greater than a diameter of rod 34. Instead of providing a slot 48, it will be appreciated any other form of radially inwardly projecting opening, such as a bore, could be employed.

A pivot pin extends through cylindrical impactor 44 in parallel spaced relation to a cylindrical axis X—X of member 44. The pin presents a first pin end 54 extending from a first axial face 45 of cylindrical impactor 44 and a second pin end 55 extending from a second axial face 47. As shown in FIG. 1, opposing surfaces 12a' and 12b' which define hammer chamber 21 are flat and parallel and sized to slideably abut the axial surfaces 45 and 47 of cylindrical hammer 44.

Figure 4:
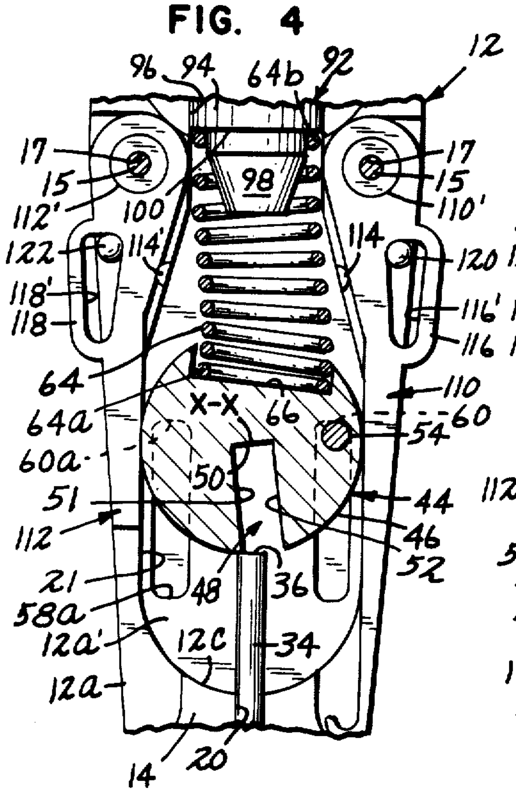
FIGS. 4 through 6 are sequential views showing operation of the insertion tool of the present invention.

Parallel slots 56 and 57 are formed in surface 12a' equally spaced from axis X—X. Likewise, identical slots are formed in surface 12b (with only slot 57' shown in FIG. 1). Opposing slots, such as slots 56 and 57' are parallel and aligned. The slots 56 and 57 extend from respective first ends 58, 58a nearest impact receiver 22 to respective second ends 60, 60a furthest from impact receiver 22. The slots 56, 57 extend in a direction parallel to the direction of sliding travel (indicated by the arrow A) of impact receiver 22 and impactor 44. The slots are disposed to receive pin ends 54 and 55 within slots 56 and 57', respectively. Slots 56, 57 are dimensioned to have the longitudinal length between ends 58 and 60 approximately equal to a desired stroke of impactor 44 in a direction parallel to the direction of travel A between a rest position (as shown in FIGS. 1 and 2) and a tensioned position or displaced (as shown in FIG. 4) with pin end 54 abutting end 60 and pin end 55 abutting end 60a'. In the rest position, impactor 44 abuts a wall 12c. As shown in FIG. 2, wall 12c is a portion of a cylinder conforming in shape to the outer surface 46 of impactor 44.

As shown in the Figures, impactor 44 is pivotal about pin ends 54 and 55 with its positioning including a load position as shown in FIG. 2 with at least a portion of outer cylindrical surface 46 of impactor 44 opposing at least a portion of force receiving end 36. The impactor 44 may be pivoted about pins 54 and 55 to a fire position (as shwon in FIG. 5) where force receiving end 36 does not oppose cylindrical wall 46 and is only opposing back wall 50.

Urging means in the form of a compression spring 64 is provided to yieldably urge the impactor 44 toward impact receiver 22 and simultaneously urge the impactor 44 toward the load position as shown in FIG. 2. As shown in FIGS. 1 and 2, impactor 44 is provided with a recess or pocket 66 sized to receive a first end 64a of spring 64. The pocket 66 is formed on the cylindrical surface of impactor 44. The positioning of the pocket 66 is such that it is at an angle to the radial line of slot 48. The amount of the angular displacement determines the amount of surface area of surface 46 which opposes force receiving end 36. Minimizing the amount of this exposed surface area is desireable since this area slides against force receiving end 36. In minimizing this area, the amount of friction in rotation of the impactor 44 (as will be described) is reduced. Compression spring 64 extends to a second end 64_b_ aligned with the direction of travel of impact receiver 22 and is held in place by a pretensioning device 70 as will now be described. Pretensioning device 70 includes a compression cam 72 which includes the cam disc 74. A pair of pivot posts 76 and 78 extend away from cam disc 74 on both sides thereof and are axially aligned. The posts 76 and 78 are provided with a continuous hexagon shaped bore 80 formed therethrough. A handle 82 extends radially away from cam element 74. Shown best in FIG. 1, handle portions 12_a_ and 12_b_ are provided with aligned bores 88 and 90 sized to receive posts 76 and 78, respectively with cam element 74 rotatably received between opposing surfaces 12_a″_ and 12_b″_ about an axis Y—Y.

Figure 3:
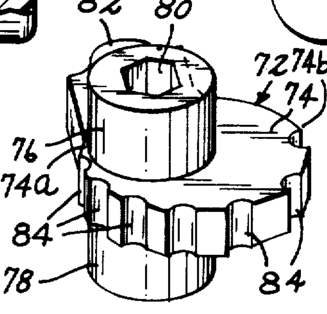
FIG. 3 is a perspective view of a compression cam for use in the insertion tool of the present invention.

As shown in FIGS. 2 and 3, the distance from axis Y—Y to the outer surface of cam element 74 progressively increases from a first end 74_a_ to a second end 74_b_. Spaced about the outer surface of cam element 74 between ends 74_a_ and 74_b_ are a plurality of notches 84 which are a portion of a cylindrical surface with the cylindrical axis of notches 84 parallel aligned with axis Y—Y. A cam follower is provided having a cylindrical body portion 94 slideably received within a cylindrical portion 96 of impactor chamber 21. The body portion 94 is slideable within chamber portion 96 in a direction parallel and axially aligned with the direction of travel A. A reduced diameter portion 98 is axially secured to body portion 94 on a side thereof facing impactor 44 with body portion 94 exposing an annular stop surface 100 opposing impactor 44. Second end 64_b_ of spring 64 is received surrounding reduced diameter portion 98 and abutting stop surface 100. A side 102 of body portion 94 facing cam 72 is contoured to present a centrally located ridge 104 aligned with an opposing notch 84 and having a radius of curvature generally equal to the cylindrical curvature of notches 84.

The insertion tool of the present invention readily accommodates wire working tools such as a wire removal tool 110 (commonly referred to as a spudger) and a block removal tool 112. The tools are positioned on opposite sides of the handle 12 and are pivotally secured to the handle at pivot points 110′ and 112′. Inner retaining elements 114 and 114′0 stop the pivotal inward movement of tools 110 and 112. Each of the tools is provided with handles 116 and 118 which may be grasped by an operator and include openings 116′ and 118′. The handles 116 and 118 may be flexed and received over small spherical rises 120 and 122 formed on handle portions 12_a_ and 12_b_. Accordingly, tools 110 and 112 may be snapped in place as shown in FIG. 2 or pivoted out of the position shown in FIG. 2 by lifting either of the handles 116, 118 to urge the tool portion over the rises 120, 122.

Figure 5:
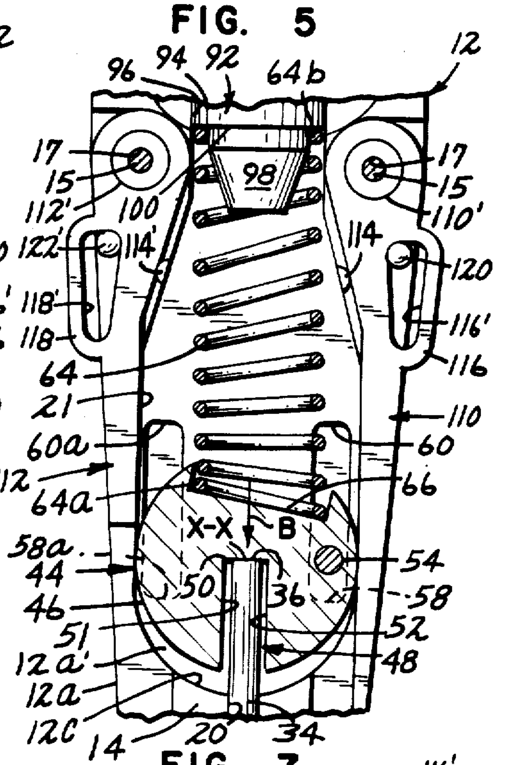
Figure 6:
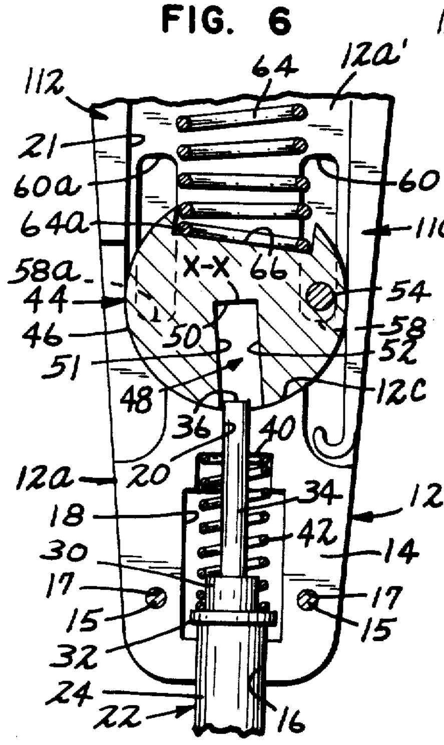

The operation of the insertion tool of the present invention will now be described by reference to sequential FIGS. 4 through 6 and with further reference to FIG. 2. In FIG. 2, the impactor 44 is shown in its rest position with its outer surface 46 abutting surface 12_c_ and with the impactor 44 pivoted to the load position with a portion of surface 46 opposing force receiving end 36. To install a wire in a terminal block, tip 26 is placed within the block with force transmitting end 28 abutting the wire to be inserted. An operator grasps handle 12 and urges the handle in a direction opposite that of arrow A. Due to resistance of motion by the wire, impact receiver 22 moves in the direction of arrow A causing compression of spring 42. Simultaneously, the force receiving end 36 abuts surface 46 and urges impactor 44 in the direction of arrow A thereby compressing spring 64. The impactor 44 moves in the direction of arrow A and remains in the load position until pin 54, 55 abut slot ends 60, 60_a′_ (as shown in FIG. 4 with pin 54 abutting end 60). At this point, due to continued upward travel of impact receiver 22, force receiving end 36 causes impactor 44 to pivot about a pivot point at a point of contact between pivot pins 54 and 55 and slot ends 60 and 60_a′_. As impactor 44 pivots, surface 46 slides along force receiving end 36 resulting in pocket 66 urging the first end 64_a_ of spring 64 out of alignment with second end 64_b_.

The rotation of impactor 44 continues until impactor 44 rotates to the fire position where force receiving end 36 is no longer opposing cylindrical surface 46 and is opposing back wall 50. At this point, the compression of spring 64 quickly forces impactor 44 downwardly (as shown by Arrow B in FIG. 5) with back surface 50 impacting force receiving end 36 thereby acting as an impactor blow on impact receiver 22 which is transmitted to the wire through end 28 causing the wire to sever on the blade of a split cylinder terminal connector.

After the impactor blow has occurred, the operator removes the tool. At this point, the impactor is in its rest position but is pivoted to the fire position as shown in FIG. 6. While the tool is being removed, spring 42 urges rod 34 out of slot 48. When rod 34 is completely clear of slot 48, the spring 64 returns to its desired position with end 64_a_ aligned with end 64_b_ thereby causing impactor 44 to pivot back to the load position as shown in FIG. 1.

From the foregoing, it can be seen how the objects of the present invention have been attained in a preferred manner. The insertion of the tool of the present invention present numerous advantages over prior art insertion tools. Namely, the present invention eliminates the need for a laterally movable sear element thereby reducing the number of parts needed to manufacture the tool which can greatly reduce the cost of manufacture and assembly. Also, the present invention provides for more space within the tool for the impactor 44 providing for a larger more massive impactor acting against a larger more forceful spring 64. As a result, a greater mass moves at a greater velocity when contacting the impact receiver 22. Accordingly, the present invention more easily severs a large gauge wire with stiff insulation as opposed to prior art insertion tools. Also, the present invention more efficiently utilizes the space of the tool to maximize the site of the impactor. Finally, the tool permits a long compression spring 64. As a result, a long stroke may be used which is easier for an operator. Also, the full compression need not be used thereby increasing the life of spring 64. The amount of impact of the impactor 44 of the present invention can be varied by increasing the pretensioning of spring 64. This is easily accomplished by rotating cam 72 to any one of the plurality of positions with notches 84 progressively urging cam follower 92 toward impactor 44. To the extent that turning cam 72 becomes difficult by hand, and hexagonal shaped tool can be inserted within bore 80 to complete turning and pretensioning of spring 64.

Figure 7:
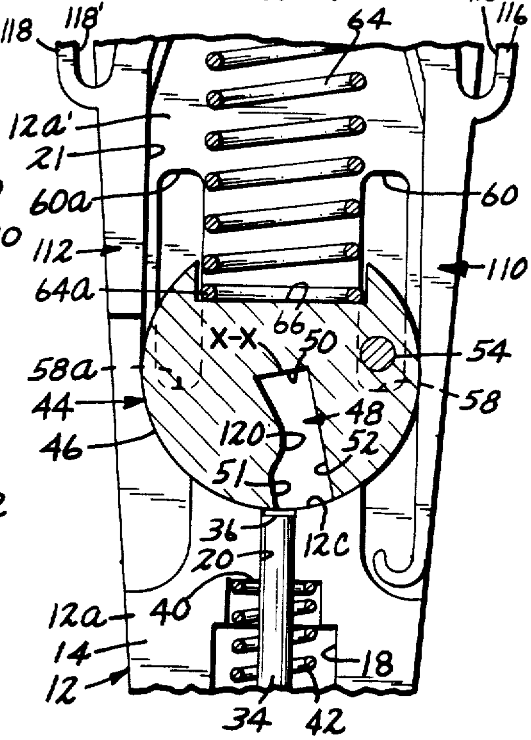
FIG. 7 is a view of an alternative embodiment of the present invention.

In addition to the benefits of the preferred embodiment, an alternative embodiment to the present invention is shown in FIG. 7. In the alternative embodiment, a ridge 120 is disposed within slot 48 on side wall 51. With the alternative embodiment shown in FIG. 7, two impacts will be experienced on the force receiving end 36 in rapid succession. The rapid succession of impacts will further assist in severing a wire.

From the foregoing detailed description of the present invention, it has been shown how the objects of the invention have been obtained in a preferred manner. However, modifications and equivalents of the disclosed concepts, such as readily occur to those skilled in the art, are intended to be included in the scope of this invention. Thus, the scope of the invention is intended to be limited only by the scope of the claims as are, or may hereafter be, appended hereto.

What I claim is:

1. A tool comprising:

a manually engageable handle;

an impact receiver having a force receiving end and a force transmitting end, said receiver carried on said handle and slideable in a predetermined direction extending between said ends;

an impactor carried on said handle on a side of said impact receiver opposing said force receiving end and slideable in said predetermined direction between a rest position and a displaced position, said impactor pivotally movable about a pivot axis between a load position and a fire position with said impactor presenting a first surface opposing said force receiving end in force transmitting relation when in said load position and presenting a second surface opposing said force receiving end in force transmitting relation when in said fire position, said second surface spaced away from said first surface on a side of said first surface away from said force receiving end;

first urging means for yieldably urging said impactor toward said force receiving end and toward said load position;

means for pivoting said impactor about an axis laterally spaced from said second surface against urging of said first urging means to said fire position as said impactor is moved to said displaced position;

second urging means for yieldably urging said impact receiver away from said impactor; and said impactor including a pivot surface cooperating with a fixed opposing surface secured to said handle to define said pivot axis.

2. A tool according to claim 1 wherein said first surface (46) of said impactor (44) is slideably engageable with said force receiving end (36) as said impactor (44) moves from said load position to said fire position;

a pivot pin secured to said impactor and spaced away from said second surface;

a pin receiving channel defined by said handle and extending generally parallel to said predetermined direction between a first end closest to said force receiving end and a second end furthest from said force receiving end, said pin positioned on said impactor to be pivotally received within said channel and engage said second end when said impactor is moved against the urging of said first urging means to said displaced position.

3. A tool according to claim 2 wherein said first urging means comprises a first spring having a first end disposed away from said impactor opposite said force receiving end and a second end connected to said impactor at a point between a point opposite said second surface and said pivot pin.

4. A tool according to claim 3 comprising pretensioning means for selectively adjusting the compression of said first spring including a cam follower connected to said first end of said first spring and a compression cam carried by said handle and engaging said cam follower; means for moving said cam to any one of a plurality of preselected positions with said cam follower urged against said first spring with a different force at each of said positions.

5. A tool comprising:

a manually engageable handle;

an impact receiver having a force receiving end and a force transmitting end, said receiver carried on said handle and slideable in a predetermined direction extending between said ends;

a cylindrical impactor carried on said handle on a side of said impact receiver opposing said force receiving end and slideable in said predetermined direction between a rest position and a displaced position, said impactor pivotal about a pivot axis displaced from a cylindrical axis of said impactor and pivoted between a load position and a fire position with said impactor presenting a cylindrical surface of said impactor opposing said force receiving end when in said load position, said impactor having a radially inwardly projecting opening formed therein with opening defining surfaces including an impact surface disposed opposing said force receiving end when said impactor is in said fire position;

first urging means for yieldably urging said impactor toward said force receiving end and toward said load position; and means for moving said impactor against urging of said first means to said fire position as said impactor is moved to said displaced position.

6. A tool according to claim 5 including a pivot pin secured to said impactor and depending therefrom;

a surface fixedly secured to said handle and disposed to engage said pin for said impactor to pivot about said pin at said surface when said impactor is moved against urging of said first urging means at said displaced position.

7. A tool according to claim 5 wherein said first urging means includes a compression spring having a first end positioned against said impactor and a second end positioned against a stop with said first end disposed against a surface of said impactor at an angle to a radial line of said radially inwardly projecting opening.

8. A tool according to claim 7 comprising means for selectively adjusting compression of said compression spring.

9. A tool according to claim 5 comprising a third surface disposed within said opening and opposing said force receiving end after said impactor moves from said load position and toward said fire position.

* * * * *